United States Patent
Chen et al.

[19]

[11] Patent Number: 6,042,795
[45] Date of Patent: Mar. 28, 2000

[54] METHODS AND APPARATUS FOR TREATING WASTE GAS STREAMS FROM WOOD BURNING PROCESSES

[75] Inventors: James M. Chen, Edison; Pascaline H. Nguyen, Holmdel; Ralph E. Truitt, New Providence, all of N.J.

[73] Assignee: Engelhard Corporation, Iselin, N.J.

[21] Appl. No.: 08/528,903

[22] Filed: Sep. 15, 1995

[51] Int. Cl.⁷ .................................................. B01D 53/38
[52] U.S. Cl. ...................... 423/210; 423/245.3; 422/169; 422/177
[58] Field of Search ................ 423/210, 245.3, 423/245.2; 422/169, 177

[56] References Cited

U.S. PATENT DOCUMENTS

| | | | |
|---|---|---|---|
| 2,833,615 | 5/1958 | Kollgaard | 423/245.3 |
| 3,660,045 | 5/1972 | Gladu | 422/169 |
| 3,870,474 | 3/1975 | Houston | 23/277 |
| 3,978,197 | 8/1976 | Betz | 423/215.5 |
| 4,134,860 | 1/1979 | Hindin et al. | 252/466 |
| 4,213,947 | 7/1980 | Fremont | 423/245.3 |
| 4,238,460 | 12/1980 | Aiken | 423/247 |
| 4,325,921 | 4/1982 | Aiken | 422/177 |
| 4,330,503 | 5/1982 | Allaire | 422/177 |
| 4,430,303 | 2/1984 | Linde | 423/239.1 |
| 4,458,662 | 7/1984 | Barnett | 126/77 |
| 4,759,777 | 7/1988 | Balakrishnan | 34/79 |
| 5,100,633 | 3/1992 | Morrison | 423/225 |
| 5,262,131 | 11/1993 | Bayer et al. | 422/175 |
| 5,263,266 | 11/1993 | Schmidt | 34/79 |
| 5,364,259 | 11/1994 | Matros et al. | 431/5 |

FOREIGN PATENT DOCUMENTS 0 629 432 A1   12/1994   European Pat. Off. ........ B01D 53/36

OTHER PUBLICATIONS

Ruddy and Carrell, "Select the Best VOC Control Strategy," Chemical Engineering Progress, Jul. 1993 (pp. 28–35).

Ruhl, "Recover VOCs via Adsorption on Activated Carbon," Chemical Engineering Progress, Jul. 1993 (pp. 37–41).

*Primary Examiner*—Steven P. Griffin
*Assistant Examiner*—Peter DiMauro
*Attorney, Agent, or Firm*—Richard A. Negin

[57] ABSTRACT

Methods and apparatus for the catalytic oxidation treatment of waste gas streams that contain entrained solids and gaseous air pollutants such as volatile organic compounds and carbon monoxide, and particularly methods and apparatus suitable for treating waste gas streams from wood burning processes. The method includes a step of washing the gas stream with water prior to the 5catalytic oxidation treatment.

8 Claims, 3 Drawing Sheets

METHODS AND APPARATUS FOR TREATING WASTE GAS STREAMS FROM WOOD BURNING PROCESSES

BACKGROUND OF THE INVENTION

1. Field of the Invention

This invention is directed to methods and apparatus for the catalytic oxidation treatment of waste gas streams that contain entrained solids and gaseous air pollutants such as volatile organic compounds and carbon monoxide, and particularly to methods and apparatus suitable for treating waste gas streams from wood burning processes.

2. Description of Related Art

Air pollutants, such as volatile organic compounds (VOC), carbon monoxide (CO) and oxides of nitrogen (NOx), are often controlled industrially by an incineration system that uses either a thermal or a catalytic process. Control of VOC and CO emissions is achieved by initiating oxidation reactions in these systems that convert the pollutants to harmless water and $CO_2$. Control of NOx is often achieved by a selective reduction reaction which reacts ammonia with NOx to form $N_2$ and water.

The abatement system is typically installed downstream of an industrial process to remove the pollutant constituents in the flue gas before the gas is emitted to the atmosphere. Thermal processes rely on homogeneous gas phase reactions for the destruction of these compounds, and normally operate at about 1500 to 1800° F. (800–1000° C.) with a residence time of about 1 second. On the other hand, the destruction reactions for catalytic processes occur at the catalyst surface rather than in the gas phase. Catalytic processes typically operate at about 600 to 1000° F. (300–550° C.) with a residence of time of about 0.1 second or less. Catalytic incineration systems are normally smaller in size, and consume less fuel than non-catalytic thermal systems.

Commercially, there are two general types of incineration designs, regenerative and recuperative, for either thermal or catalytic processes. Regenerative thermal oxidizer (RTO) or regenerative catalytic oxidizer (RCO) systems have very high thermal efficiency (>90%). Recuperative thermal or catalytic oxidizers typically have a heat recovery of no greater than 70%. Selection of regenerative or recuperative type of oxidizers depend primarily on the exhaust concentrations and the exhaust flows, which also affect the operating and capital costs of the abatement system.

A typical regenerative thermal oxidation system is described in Houston, U.S. Pat. No. 3,870,474, incorporated herein by reference. In such a process, the VOC's and CO in a gas stream are incinerated at a relatively high temperature of about 1500° F. Before entering the combustion zone, the gas stream passes through a first packed column of heat transfer packing material which heats the gas, and then exits through an identical second packed column which is heated by the gas from the combustion zone. Thus the hot gas exiting the combustion zone passes through a packed column, heating the packing material therein. Then the flow of the gas is reversed, and the incoming gas is heated as it passes through the packed column. By the use of such regenerative processes, the efficiency of thermal incineration has been greatly increased.

A drawback of such thermal oxidation systems is that they require heating the gas stream to the relatively high temperature of about 1500° F. The 3,870,474 patent does indicate, at column 6, lines 3–7, that a suitable combustion catalyst may be placed in the warmest part of the regenerators to cause the contaminants in the air to be oxidized at a lower temperature.

For industrial processes that use wood materials or wood products as fuel, e.g. board mills, wood fired boilers, etc., the exhaust gas after combustion generally contains particulates as well as VOC and CO gaseous pollutants. Therefore, before the gas stream is directed to an incineration system to remove the VOC and CO pollutants, the gas is often treated to remove entrained particulate matter to prevent such particulates from interfering with the incineration process. Various methods are known for removing entrained solids from gas streams, as discussed in detail in the section on Gas-Solids Separations, Chemical Engineers' Handbook, Fifth Edition, 1973, pages 20–74 to 20–121. Such gas-solid separation systems, may be generally grouped into dry removal systems, in which equipment such as cyclones or electrostatic precipitators remove the dust from the air stream, and wet removal system, known as scrubbers, in which a liquid, usually water, is added or circulated to assist in the collection process (see Handbook, page 20–94).

In test operations involving RCO treatment of a flue gas stream from a wood burning process, the present inventors observed that in an operation in which particulates were removed prior to RCO by dry electrostatic precipitation (ESP), the catalyst quickly fouled and was rendered inactive. On the other hand, when the particulates were removed by a wet scrubber using water to assist in the collection process, the catalyst in an identical RCO system was observed to remain active indefinitely. There was therefore a need to determine why the catalyst fouled in one instance, and remained active in the other, and to develop a method for preventing the fouling of the catalysts in such catalytic oxidation systems.

SUMMARY OF THE INVENTION

The present inventors determined that the presence of water soluble fatty acid salts in exhaust streams from wood burning processes was causing the fouling of the catalyst in catalytic oxidation processes. Therefore, the present invention is directed to a method for treating a waste gas stream which contains entrained water soluble fatty acid salts, and one or more gaseous contaminants which are removable by catalytic oxidation, wherein the method comprises washing the water soluble fatty acid salts out of the waste gas stream; and then passing the washed gas stream over the surface of a catalyst suitable for effecting the catalytic oxidation of said gaseous contaminants under conditions at which such catalytic oxidation will take place.

The present invention is further directed to apparatus for treating a waste gas stream which contains entrained water soluble fatty acid salts, and one or more gaseous contaminants which are removable by catalytic oxidation, wherein the apparatus comprises a gas-liquid contact device for washing the water soluble fatty acid salts out of the waste gas stream; and a catalytic thermal oxidizer wherein the washed gas stream can be passed over the surface of a catalyst suitable for effecting the catalytic oxidation of said gaseous contaminants under conditions at which such catalytic oxidation will take place.

In industrial processes that use wood materials or wood products as fuel, e.g. board mills, wood fired boilers, etc., the exhaust gas after combustion was found to often contain particulates of carbonates, carboxylic acid and carboxylic acid salts (fatty acid salts). These fatty acid salts are released during combustion, either from their presence in the wood materials, or through chemical combination reaction between carboxylic acid and alkaline compounds in the wood structure. These salts typically become molten liquids at temperatures of about 300 to 500° F. (150–260° C.), but do not volatilize or decompose until at temperatures of about 1200 to 1500° F. (650–800° C.). When entering a catalytic emission control system, which typically operates at temperatures of about 600–1000° F. (300–550° C.), these organic salts appear as molten liquid entrained in the flue gas and deposit on the catalyst surface and the reactor walls. Even though the organic fractions of the salt compounds are oxidized by the catalyst, the inorganic fractions were found to remain on the catalyst surface to mask the catalyst accessibility, thereby causing rapid performance degradation of catalytic system. Also, these salts react readily with the support structure and heat transfer materials to create serious corrosion problems for thermal oxidation systems. These problems substantially increase maintenance requirements, and consequently, the emission control cost for these processes. Thus it was recognized that a process was needed for removing these organic salts from the flue gas prior to entering a catalytic oxidation device for controlling air emissions.

The present inventors have found that these organic salts are predominantly sodium and potassium-containing carboxylic salts which are highly soluble in water. Utilizing this solubility property, this invention is directed to a method that can be used effectively to control air emissions for plants that emit fatty acid salts in the exhaust stream. This method comprises the use of a gas-liquid contact device and an emission control device. Flue gas coming from a wood burning plant is first fed into a gas-liquid contact device, where the gas is contacted with water. The gas-liquid contact device, such as wet scrubber, a liquid spray tower, etc, is designed to increase contact between liquid and gas. In the gas-liquid contact device, these fatty acid salts are removed from the flue gas by dissolving into water droplets or mists that are in contact with the gas. The treated gas stream, which will be substantially free of these organic acid salts, can then be fed to the oxidation system for the removal of air pollutants. In the absence of these salts, the catalytic oxidation system can provide long service life without being deactivated due to particulate masking, and thereby the overall emission control costs can be reduced.

BRIEF DESCRIPTION OF THE DRAWINGS

The following drawings in which like reference characters indicate like parts are illustrative of embodiments of the invention and are not intended to limit the invention as encompassed by the claims forming part of the application.

DESCRIPTION OF THE PREFERRED EMBODIMENT

Figure 1:
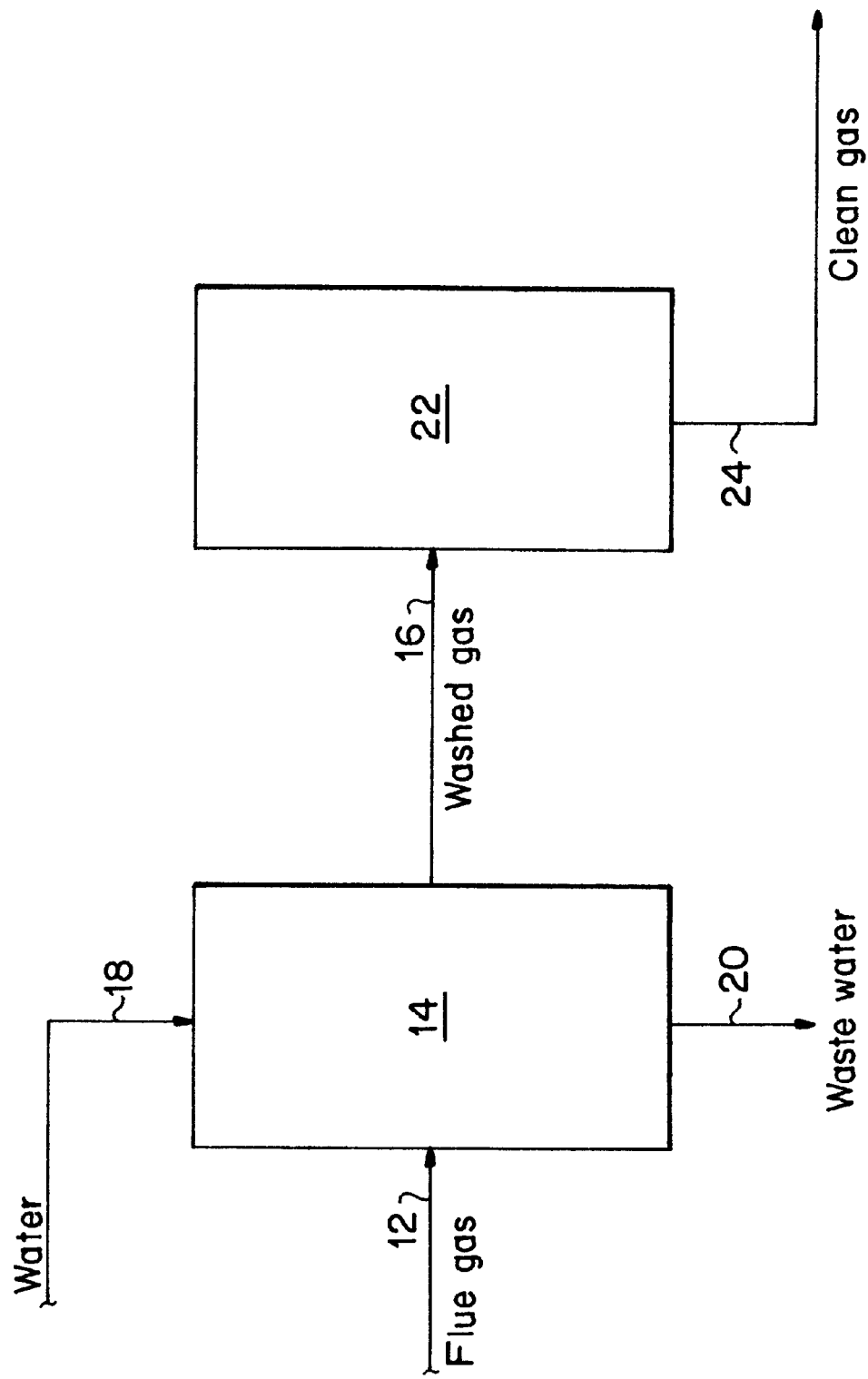
FIG. 1 is a schematic representation of one embodiment of the present invention.

A schematic diagram of a flue gas emission control system for a wood burning process in accordance with the present invention is shown in FIG. 1. A dirty flue gas stream 12 passes through a gas-liquid contact device 14, where the gas is contacted with water, and exits the contact device as washed gas stream 16. A water stream 18 enters contact device 14 where it interacts with the flue gas, and exits as waste water stream 20, which then goes to a water recovery or treatment system, not shown. After exiting the contact device, washed gas stream enters a catalytic oxidation unit 22 where the VOCs and CO contained in the gas stream are oxidized to $CO_2$ and water. Clean gas stream 24 then exits the oxidation unit and passes to the atmosphere.

Figure 2:
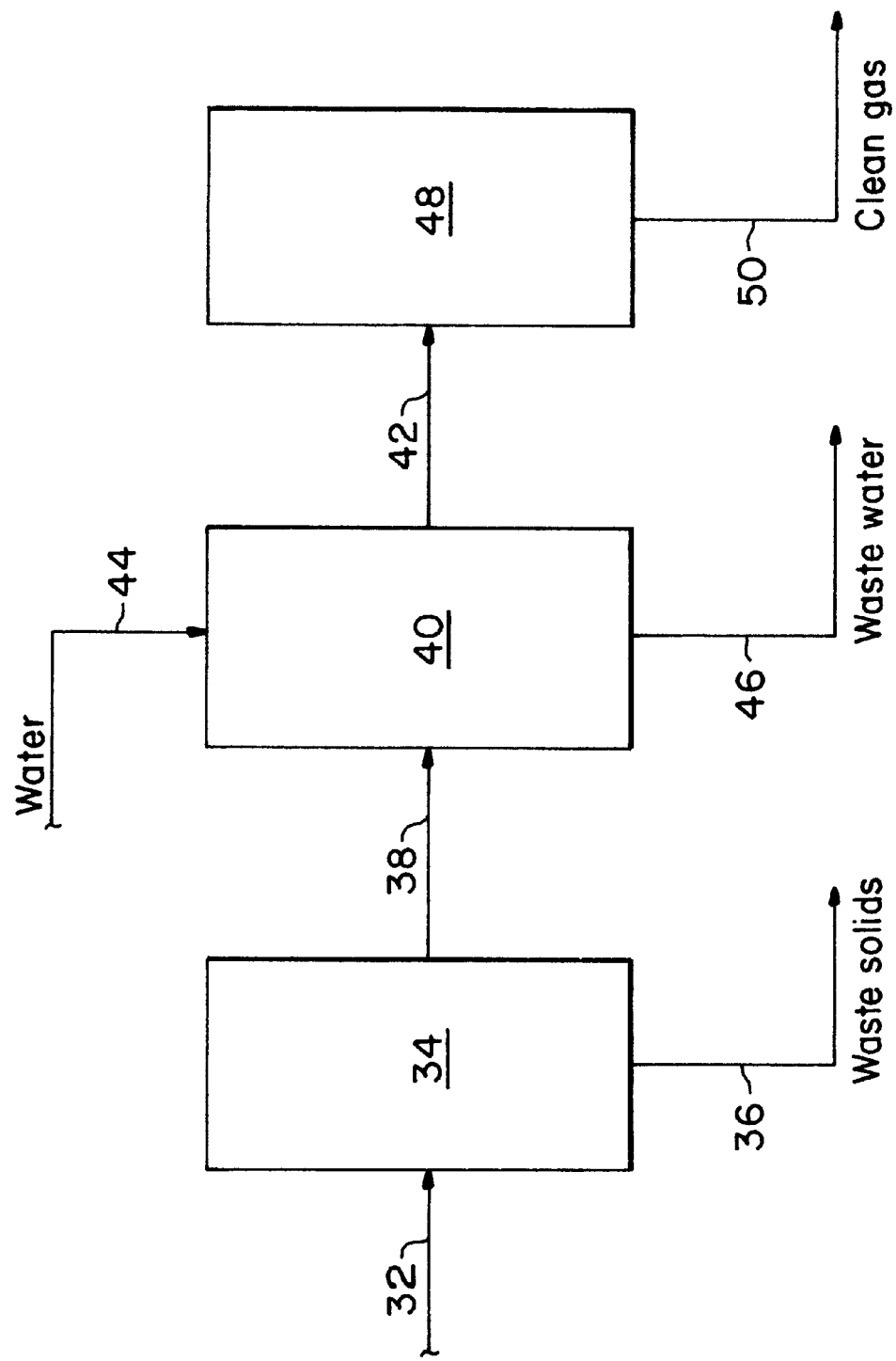
FIG. 2 is a schematic representation of a further embodiment of the present invention.

An alternative embodiment of the present invention is depicted in FIG. 2. A dirty flue gas stream 32 passes through a dry gas-solids separation device such as electrostatic precipitator 34 which removes much of the solid contaminants from the gas stream as waste product stream 36. The gas stream 38 exiting the precipitator then passes through a gas-liquid contact device 40, where the gas is contacted with water, and exits the contact device as washed gas stream 42. A water stream 44 enters contact device 40 where it interacts with the flue gas, and exits as waste water stream 46, which then goes to a water recovery or treatment system, not shown. After exiting the contact device, washed gas stream 42 enters a catalytic oxidation unit 48 where the VOCs and CO contained in the gas stream are oxidized to $CO_2$ and water. Clean gas stream 50 then exits the oxidation unit and passes to the atmosphere.

In the embodiment of the invention depicted in FIG. 1, the gas-liquid contact device is preferably a wet scrubber which removes all of the particulates from the gas stream, as well as the water-soluble fatty acid salts. In the embodiment depicted in FIG. 2, the waste gas stream first passes through an electrostatic precipitator, which removes most of the particulate matter. But, as discussed elsewhere, it was found that such electrostatic precipitators do not remove the fatty acid salts which cause loss of catalyst activity in the catalytic oxidizer. Therefore, gas-liquid device 40 is needed to wash the water soluble fatty acids salts from the waste gas stream. However, because the waste gas stream has already had most of the entrained particulates removed by the electrostatic precipitator, this gas-liquid device does only needs to supply an adequate amount of water to remove the soluble fatty acid salts.

The following tests were conducted first to determine the cause of the catalyst fouling which was observed in some flue gas treatment systems, and then to develop a method to overcome the problem.

EXAMPLE 1

A pilot test was made to determine the effectiveness of a catalytic oxidation system to control VOC emissions from a board mill plant. A slip stream taken downstream of a dry electrostatic precipitation device was pumped to the catalytic oxidation pilot unit where Pt catalysts supported on honeycombs and spheres were housed. The catalyst beds were maintained at about 800° F. (425° C.) for oxidizing VOC and CO gases. After 60 hours of test, catalyst samples were found to have been substantially deactivated from the fresh level in the laboratory test. Surface analysis by scanning electron microscope (SEM) and energy dispersive X-ray (EDX) revealed the formation of a surface glaze from the deposition of particulates on the catalyst surface. These particulates were analyzed to be mostly potassium, sodium and sulfur containing compounds.

For the same pilot test, particulate samples entrained in the gas before and after the catalyst bed were collected by using sampling trains equipped with particulate filter paper in series with liquid bubblers. Particulates that were collected on the filter paper and from evaporating the solutions were analyzed by IR. IR results showed that particulates collected upstream of the catalyst consist of carbonates, sulfates, fatty acids, and fatty acid salts. No fatty acid salts, however, were found at the outlet of the catalyst bed. It is believed that essentially all the fatty acid salts deposited on the catalyst or reactor surfaces. The organic fraction of the fatty acid salts were oxidized and decomposed, leaving the inorganic fractions, which are mostly potassium and sodium compounds, deposited on the catalyst and on the reactor surfaces.

To determine if fatty acid salts present in such exhaust gas streams are soluble in water, the particulates collected on the filter before the catalyst bed were immersed in water. The solution and the precipitated solid were collected separately. The solution was then dried, and the remaining solid powder and the precipitated solids were analyzed by infrared (IR) analysis. IR results showed that the fatty acid salts had dissolved in the water. From these results, it can be seen that fatty acid salts can be easily removed from flue gas by contacting the flue gas with liquid water. Thus, a gas-liquid water contact device, such as a wet scrubber should be effective to remove fatty acid salts.

In conducting this test, exhaust gas particulates were collected on filters at the inlet and outlet of the RCO device and analyzed with IR to determine their chemical compositions. The IR analysis of the particulates collected on the RCO inlet filter showed that there were fatty acid salts, carbonates and some carbonaceous compounds. No fatty acids were collected on the filter. Elemental scan from X-ray fluorescence (XRF) and EDX spectrum analysis revealed that most cations present were K, Na and some Ca. IR analysis on water extracted from this filter showed that these solids all dissolved in water. On the RCO outlet filter, the solids detected were only carbonates and sulfates.

No fatty acid salts were found. Dust particulates take for the catalyst chamber were found to contain mostly $SO_4$ and $CO_3$, but no fatty acid salts. The same results were found on the dust deposited on the catalyst itself. From the analyses of these samples, it was concluded that most fatty acid salts were oxidized when passing through the catalyst bed.

These results showed that fatty acid salts, which are water soluble, were only detected at the RCO inlet, but not at the outlet. Hence, the fatty acid salts must have been remained in the reactor and been deposited on the catalyst surface or elsewhere in the RCO system. The material balance for fatty acid salts around the catalyst bed indicated that essentially all fatty acid salts were trapped by the RCO device. The analysis of the dust deposited on the catalyst and reactor walls showed that the fatty acid fraction of the salts was oxidized, leaving the inorganic $SO_4$ and $CO_3$ particulates that either remained on the catalyst or elsewhere in the reactor.

Using a melting point apparatus, the particulates on the inlet filter were found to melt at temperatures greater than 180° C. TGA/DTA analysis on these particulates showed a substantial weight loss occurring at about 600–800° C., during which an exothermic DTA peak was displayed. This exotherm is believed to be from the oxidation of the organic fractions of the fatty acid salts. These analyses show that the fatty acid salts present in the flue gas will become molten liquid after been heated to above 180° C., and will not vaporize or decompose unless heated to a temperature above about 600–700° C.

As discussed above, although fatty acid salts were collected on the RCO inlet filter, no fatty acids per se were found. However, fatty acids were detected in the condensables collected at the RCO inlet. These fatty acids were only detected in a $CH_2Cl_2$ rinse of these condensables, and not in a water rinse. These results indicate that the fatty acids were most likely present as gaseous organic compounds at the operating temperatures, and are therefore merely part of the volatile organic compounds (VOC) that the catalysts are intended to treat. The results also show that unlike the fatty acid salts, the fatty acids themselves are not soluble in water. Comparing the amount of fatty acid at the inlet and outlet of the RCO, it was found that at least 90% of the fatty acids were oxidized by the catalyst. Because the deposits on the catalysts were found to be inorganic salts, it is not believed that these water-insoluble fatty acids are a factor in the fouling of the catalyst.

As a further note, exhaust gas samples were analyzed by gas chromatography and mass spectroscopy (GC/MS). The VOC compounds present in the gas stream were all found to be readily converted by RCO catalyst at temperatures above 600° F. (300° C.). Also, there were no catalyst poisoning gases, such as chlorinated compounds, $SO_2$ or siloxanes, that can inhibit or deactivate the catalyst performance.

As a further test, catalyst samples were taken after different periods of aging. On the catalyst surface a glaze of deposits had been formed on the aged samples (144 hours). This surface glaze was mostly concentrated on the inlet side of the catalyst beds. The surface glaze appeared to be agglomerates of particulates of about 2 $\mu$m size. Elemental analysis by EDX spectrum showed that the surface glaze consisted of deposits of potassium and sodium salts.

Figure 3:
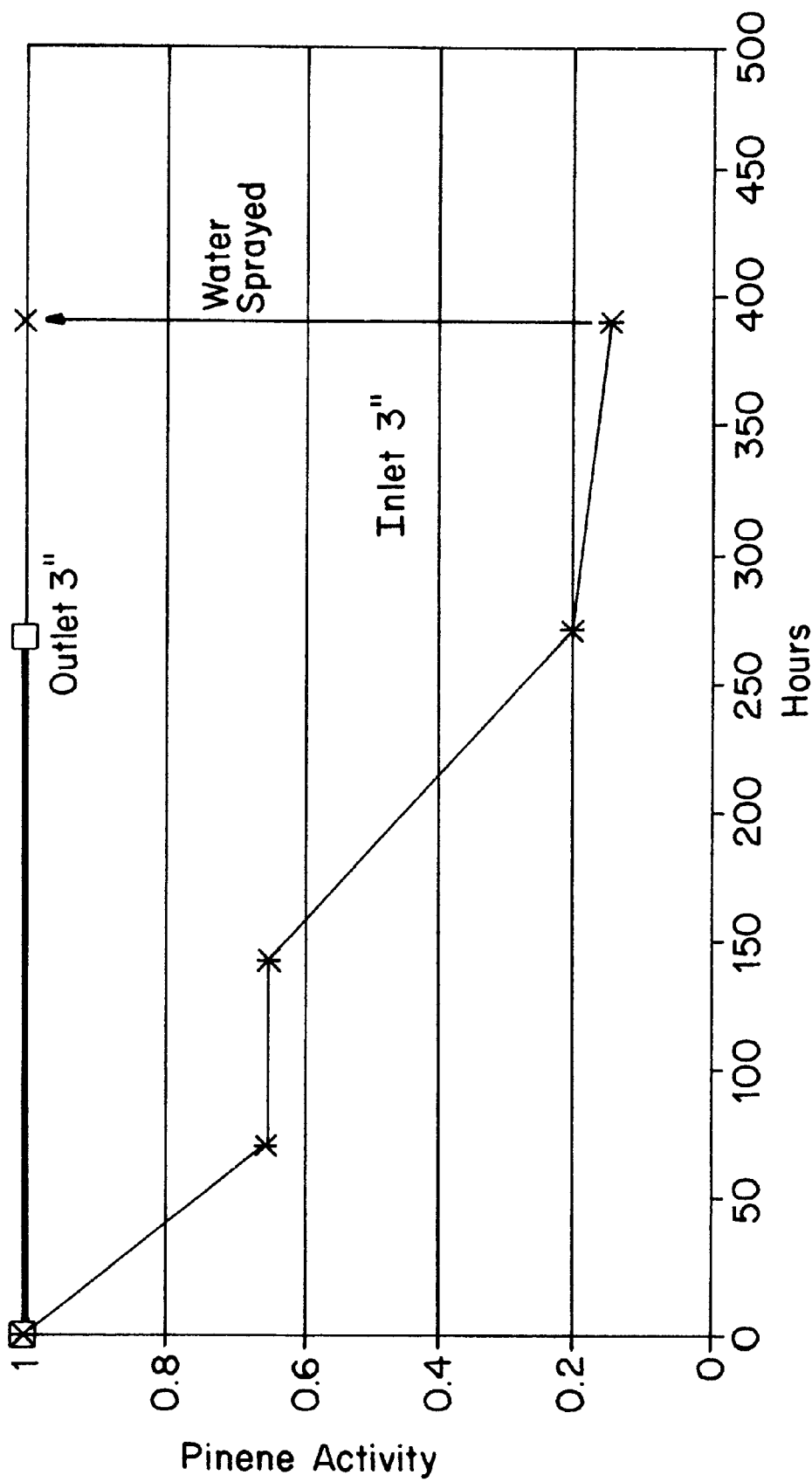
FIG. 3 is a graph showing catalytic activity test results.

The activity of the catalyst was monitored by measuring the VOC conversions of alpha pinenes. The results of these tests are depicted in FIG. 3. Samples of the catalyst from the inlet side of the catalyst bed showed a marked decrease in activity as the bed was aged over 400 hours. Yet, the activity of samples taken from the outlet side of the bed showed no measurable loss of activity after 270 hours. This shows that the contaminants were all collecting on the inlet side of the catalyst bed, and were essentially removed from the gas stream before the stream reached the outlet of the bed. In addition, when a sample of the inactivated catalyst which had been aged 400 hours was sprayed with water, full activity was restored. This shows that the deactivating deposits on the catalyst were water soluble.

EXAMPLE 2

A separate pilot test was made to determine the effectiveness of a catalytic oxidation system after a wet scrubber to control VOC emissions from a board mill plant. A slip stream taken downstream of a wet scrubber was pumped to the catalytic oxidation pilot unit of Example 1 where Pt catalysts supported on honeycombs and spheres were housed. The catalyst beds were maintained at about 800° F. (425° C.) for oxidizing VOC and CO gases. The catalyst samples showed no activity decay during 60 days of operation. Compared with the dry electrostatic precipitator used in Example 1, the wet scrubber was very effective in removing fatty acid salts, thereby substantially improving the catalyst life for these applications.

What is claimed is:

1. A method for treating a waste gas stream which contains entrained water soluble fatty acid salts, and one or more gaseous contaminants which are removable by catalytic oxidation, wherein the method comprises the steps of:
   a. washing the water soluble fatty acid salts out of the waste gas stream; and
   b. passing the washed gas stream over the surface of a catalyst suitable for effecting the catalytic oxidation of said gaseous contaminants under conditions at which the catalytic oxidation will take place.

2. The method of claim 1 wherein the waste gas stream is passed through a dry gas-solids separation device prior to the step of washing to remove a portion of any solids which may be entrained in the gas stream.

3. The method of claim 1 wherein the waste gas stream is passed through a dry gas-solids separation device to remove a portion of the entrained solids prior to the step of washing.

4. The method of claim 1 wherein the waste gas stream is produced by a wood burning process.

5. An apparatus comprising: a waste gas stream which contains entrained water soluble fatty acid salts, and one or more gaseous contaminants which are removable by catalytic oxidation, wherein the apparatus further sequentially comprises:
   a. a gas-liquid contact device for washing the water soluble fatty acid salts out of the waste gas stream; and
   b. a catalytic thermal oxidizer wherein the washed gas stream can be passed over the surface of a catalyst suitable for effecting the catalytic oxidation of said gaseous contaminants under conditions at which such catalytic oxidation will take place.

6. The apparatus of claim 3 further comprising a dry gas-solids separation device for separating entrained solids from the waste gas stream prior to said gas-liquid contact device.

7. An apparatus comprising: a waste gas stream from a wood burning process wherein the gas stream contains entrained water soluble fatty acid salts and one or more gaseous contaminants which are removable by catalytic oxidation, wherein the apparatus further sequentially comprises:
   a. a gas-liquid contact device for washing the waste gas stream with water; and
   b. a catalytic thermal oxidizer wherein the washed gas stream can be passed over the surface of a catalyst suitable for effecting the catalytic oxidation of said gaseous contaminants under conditions at which such catalytic oxidation will take place.

8. The apparatus of claim 7 further comprising a dry gas-solids separation device for removing a portion of the entrained solids prior to the step of washing.

* * * * *